United States Patent Office 2,917,062
Patented Dec. 15, 1959

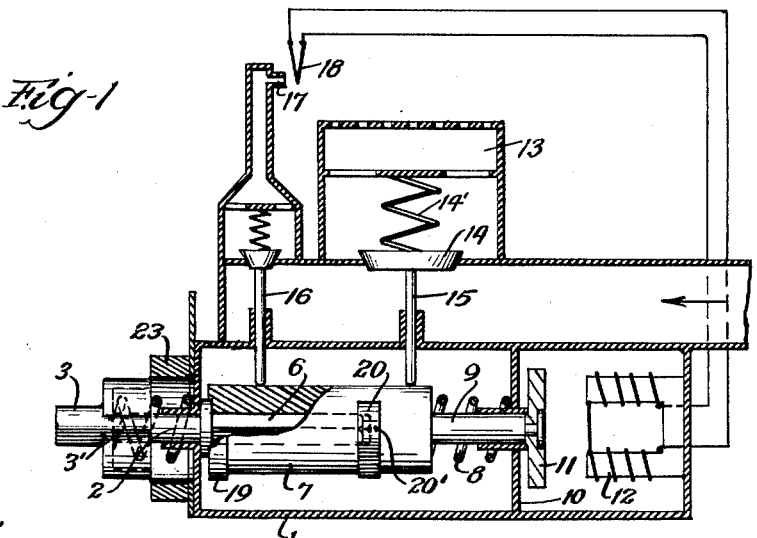
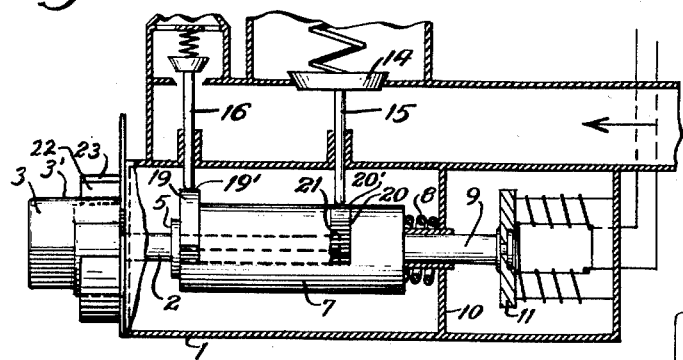
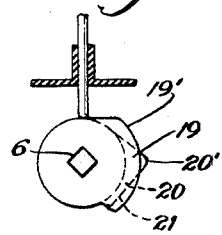
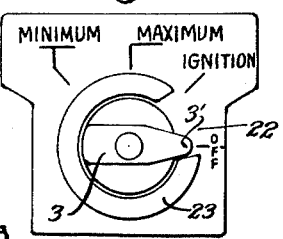
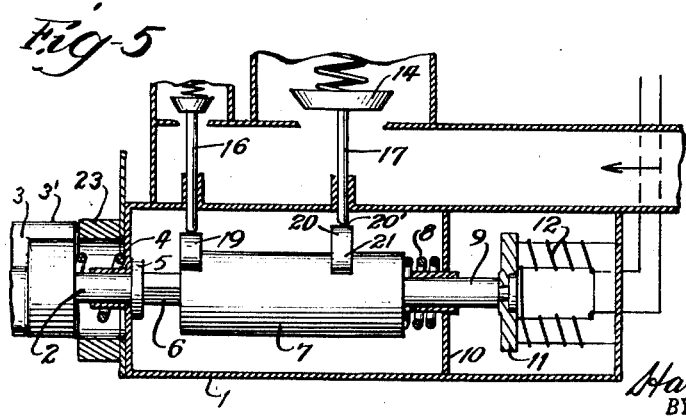

2,917,062

SAFETY-COUPLED MAIN AND PILOT GAS VALVES

Hans Schuchardt, Heidelberg-Pfaffengrund, Germany, assignor to Joh. Vaillant K.G., Remscheid, Germany Application October 11, 1954, Serial No. 461,380

Claims priority, application Germany October 10, 1953

7 Claims. (Cl. 137—66)

This invention relates to a gas valve with thermically controlled ignition safety device for gas apparatus, in particular for heating units.

Gas valves are known in which a manually operated valve control member forces the armature in contact with the poles of a thermo-electrically excited magnet against the action of a spring and in which by a further movement of the control member the latter can only open the valve when the armature has been attracted by the magnet. With thermo-electrical ignition safety devices constructed according to the principle described hereinbefore, certain difficulties have to be encountered when setting the burner to a minimum output shall be effected, which is generally desirable with heating units, hearths and similar gas heating apparatus. To effect setting the burner to a minimum output it is required to keep the gas valve in an intermediate position; but with a thermo-electrically ignition safety device of the type referred to above additional and complicated locking means or an additional valve would be required for this purpose.

According to the invention the possibility of setting a thermically controlled gas valve to a minimum output is obtained thereby that by means of valve control element which is operated externally, an arresting member is forced against the action of a spring into the range of a thermically controlled holding device, and thereby that the control element is so designed that it can be axially displaced and may perform a rotary movement, and that by an axial displacement of the control element the arresting member is moved into an effective position and simultaneously a control cam connected with the arresting member and rotating together with the control element comes into the range of a valve tappet. The control cam actuating the gas valve can be shaped in known manner, so that the gas valve is fully opened at one position of the cam and set to a minimum at another position of the cam.

The invention and its reasonable application is explained in detail by means of a schematically represented embodiment which is shown in the accompanying drawings. In this embodiment, the holding device is formed by a thermo-electrically excited magnet. It is understood that the invention is not limited to thermo-electrical ignition safety devices, and it is of course possible to provide another type of holding device, e.g., a mechanically operated mechanism which, for example, can be controlled by a liquid thermo-regulator or by a bi-metallic spring.

Figure 1 is a longitudinal sectional view, somewhat diagrammatic, of the form of the invention chosen for illustration.

Figure 2 is a fragmentary transverse sectional view showing especially the relationship of the cams to one another.

Figure 3 is a fragmentary end view showing especially the relationship of the handle to the restraining collar and to the handle position indicia.

Figure 4 is a fragmentary view similar to Figure 1 but showing the parts in the "ignition" position.

Figure 5 is a view similar to Figure 4 but showing the parts in the "maximum" position.

A control shaft 2 carrying a manually operated handle 3 which is forced toward the outside by means of a compression spring 4 so that a collar 5 lies in contact with the wall of the housing 1 is borne rotatably and axially displaceable in the housing 1 of the gas valve. The portion of the control shaft 2 which lies inside the housing 1 consists of a square end 6 on which a control element 7 is guided for axial displacement. A spring 8 forces the control element 7 against the collar 5 of the control shaft 2. A pin 9 of the control element 7 is borne in a partition wall of the housing 1. The armature 11 of a thermo-electrically excited electromagnet 12 is disposed rotatably on the end of the pin 9.

The gas valve 14 controlling the gas supply to the burner 13 is loaded by a spring 14' and extends with its valve tappet 15 into the switch housing. A smaller ignition gas valve 16 is arranged in the same manner and in parallel to the valve 14 and controls the gas supply to an ignition burner 17 in front of which a thermocouple 18 is disposed which feeds the magnet 12. The control cams 19, 20 are arranged on the control element 7 in distances which correspond to those of the valve tappets 15, 16. The apex 19' of the control cam cooperating with the ignition gas valve 16 is displaced in positive sense relatively to the apex 20' of the control cam 20. The control cam 20 has a slight slope behind its apex 20' so that a control face 21 with decreasing valve lift is formed.

The handle 3 lies with a nose 3' in the region of a collar 23 which is provided with a recess 22. When pressing in the handle 3, the nose 3' can enter the recess 22 so that an axial displacement of the control shaft 2 can take place. The control element 7 is thereby moved by the collar 5 against the action of the spring 8 and the armature 11 is pressed against the poles of the magnet 12. During this movement of the control element 7, the control cams 19, 20 come into the range of the valve tappets 16, 15.

The recess 22 is so dimensioned that the switch handle 3 can be turned only by a limited angle into the position designated by Ignition. Thereby, only the ignition gas valve 16—but not the main valve 14—is opened by the advancing apex 19' of the cam 19. Now, with the handle 3 pressed in, the ignition flame can be lighted at the point designated by the numeral 17. With the ignition flame burning, the magnet 12 is excited by the thermocouple and retains the armature 11 together with the control element 7. Also when the handle 3 is again released and the control shaft 2 is moved back into its initial position under the influence of the spring 4, the armature remains now in attracted position. The handle 3 can be further turned, since the nose 3' lies now outside the collar 23, the control element 7 moved by the square end 6 performing the same rotation. The valve 14 is thereby opened by the cam 20. The valve is completely opened and the burner is set to the position maximum when the valve tappet 15 rests on the apex 20' of the cam 20. A setting to minimum output is effected by further turning the handle 3 up to the position minimum, the sloping control face 21 of the cam 20 coming hereby into action. If the ignition flame is not lighted, the main gas valve 14 cannot remain open, as the magnet 12 does not keep the control element in attracted position and therefore the control cam 20 cannot remain in the range of the valve tappet 15. The collar 23 acts as an additional safety device and prevents opening of the main gas valve 14 while the handle 3 is in pressed in position.

I claim:

1. In a gas apparatus, for connection to a gas burner and a gas supply pipe, a valve housing for forming a communicating channel between the supply pipe and the burner, a valve disposed in said valve housing governing this channel, a spring which tends to force the valve into the closed position, a valve tappet secured to said valve, a control element to be actuated from the outside, said control element borne in said housing so as to be capable of being turned and displaced axially between two end positions, elastic means which tend to bring the control element into one end position, a holding device which, when excited, retains the control element in the other end position after the control element has been brought manually into this end position against the action of the elastic means, a control cam disposed to rotate with the control element, said control cam having such a position relatively to the valve tappet when the control element is in said other end position that the cam cooperates with said valve tappet for displacing the valve, in accordance with the turning of the control element from the outside.

2. An arrangement according to claim 1, in which the holding device is formed by a magnet cooperating with an armature connected to said control element and which is forced against the magnet by the axial movement of said control element.

3. An arrangement according to claim 1, in which said control element is guided by a control shaft having non-circular cross section on which said control element carrying said control cam is so borne that it can be axially displaced between the two end positions and can be rotated with said control shaft.

4. In a gas apparatus, for connection to a gas burner and a gas supply pipe, a valve housing for forming a communicating channel between the supply pipe and the burner, a valve disposed in said valve housing governing this channel, a spring which tends to force the valve into the closed position, a valve tappet secured to said valve, a control element to be actuated from the outside, said control element borne in said housing so as to be capable of being turned and displaced axially between two end positions, elastic means which tend to bring the control element into one end position, said control element being operable by a control shaft having non-circular cross section on which said control element carrying a control cam is so borne that it can be axially displaced between said two end positions and can be turned by said control shaft, a holding device retaining the control element in the other end position after it has once been forced manually by an axial displacement of the control shaft into this end position, said control cam arranged on said control element so as to cooperate with said valve tappet for displacing the valve when said control element is in said other end position, a collar having a recess, a handle provided on said control shaft, said collar being positioned to block axial movement of the handle except when aligned with said recess, said handle entering said recess when axial displacement of the handle and the control shaft is effected, the valve housing forming a pilot gas channel by-passing the main gas valve, a pilot gas valve in said housing governing the pilot gas channel, a valve tappet secured to said pilot gas valve, a second control cam for the actuation of the pilot gas valve disposed on the control element, said second control cam being displaced angularly ahead of the first named control cam, the recess of said collar being so dimensioned that the handle has a sufficient freedom of rotation for the actuation of the pilot valve, only, when said handle has entered said recess.

5. A safety valve assembly, for control of gas burners equipped with pilot means and a thermal device responsive to heat from flame from the pilot means, comprising a valve body having main and auxiliary outlets, a handle, a main valve comprising the sole valve operable by said handle for controlling the flow of gas to the main outlet, coupling means between the handle and the main valve movable between an effective position in which said handle controls the main valve and can be left in a condition causing the main valve to remain fully open, partially open or closed, and a position rendering the handle incapable of opening the main valve, and holding means adapted to be controlled by said thermal device when heated for holding said coupling means in its effective position.

6. A safety valve assembly, for control of gas burners equipped with pilot means and a thermal device responsive to heat from flame from the pilot means, comprising a valve body having main and auxiliary outlets, a handle, a main valve comprising the sole valve operable by said handle for controlling the flow of gas to the main outlet, coupling means between the handle and the main valve movable by the handle to an effective position from a position rendering the handle incapable of opening the main valve, said coupling means, if held in its effective position after the handle is returned, making the handle effective when moved to and left in selected positions to control operation of the main valve between fully open, partially open and closed settings, and holding means adapted to be controlled by said thermal device when heated for holding said coupling means in its effective position if moved to said position by initial movement of said handle, an auxiliary control valve, means coupling the handle to the auxiliary control valve to open the latter with a preliminary valve opening movement of the handle which precedes the movement of the handle required to open the main valve, and means effective while the handle is in a position to effectuate the coupling means between the handle and the main valve to restrict the valve-opening movement of the handle to said preliminary movement.

7. In a gas apparatus for connecting a gas supply pipe to a main burner and a pilot burner, a valve housing for forming a communicating channel between a supply pipe and the main burner, a main valve disposed in said housing governing this channel, a spring which tends to force the main valve into the closed position, a handle carried by the housing externally thereof for a turning movement and for an axial movement and biased in one axial direction, means preventing the axial movement except when the handle is in a restricted angular zone and preventing turning the handle beyond the restricted angular zone when it has been moved in the opposite axial direction, pilot valve means operable by said handle when it is moved in said opposite axial direction to open a pilot valve, effectuating means responsive to heat from a pilot flame and means operated by said handle when effectuated by the effectuating means and when the handle is axially returned and turned to a chosen one of several positions beyond said restricted angular zone for causing at will the fully open, partially open and closed settings of the main valve.

References Cited in the file of this patent

UNITED STATES PATENTS

| | | |
|---|---|---|
| 2,481,265 | Van Denberg et al. | Sept. 6, 1949 |
| 2,588,179 | Thornberry | Mar. 4, 1952 |
| 2,746,472 | Sogge | May 22, 1956 |